Figure 1:
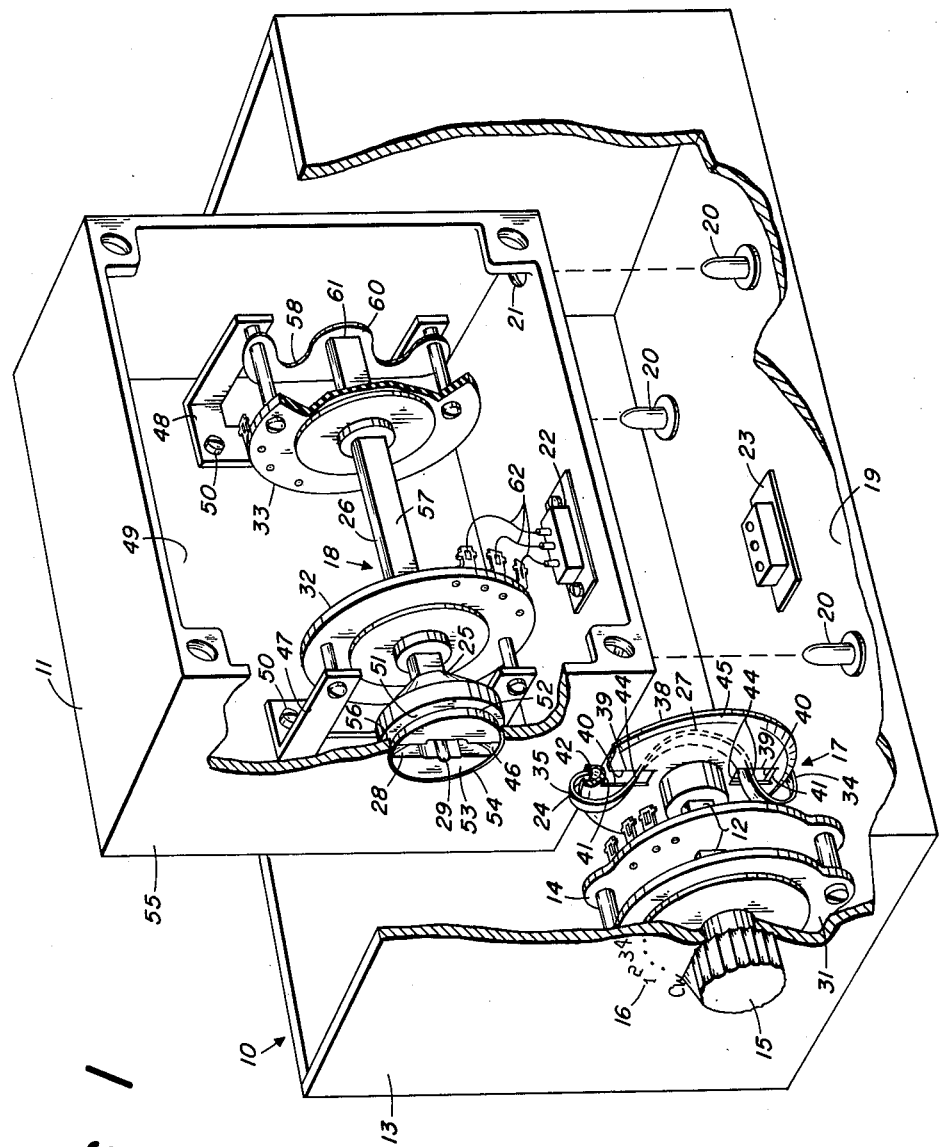

May 1, 1962  R. K. JOHNSON  3,031,866
COUPLING MECHANISM

Filed March 6, 1961  2 Sheets-Sheet 1

INVENTOR.
RAYMOND K. JOHNSON
BY *Moody and Kintzinger*
ATTORNEYS

May 1, 1962 R. K. JOHNSON 3,031,866
COUPLING MECHANISM

Filed March 6, 1961 2 Sheets-Sheet 2

INVENTOR.
RAYMOND K. JOHNSON
BY
ATTORNEYS

United States Patent Office 3,031,866
Patented May 1, 1962

---

3,031,866
COUPLING MECHANISM
Raymond K. Johnson, Cedar Rapids, Iowa, assignor to Collins Radio Company, Cedar Rapids, Iowa, a corporation of Iowa
Filed Mar. 6, 1961, Ser. No. 93,725
8 Claims. (Cl. 64—27)

This invention relates to the coupling of two rotatable members and is particularly concerned with a flexible coupling for transmitting torque to a position setting system in a removable module of electronic gear.

There are many problems in coupling one rotatable member to another, particularly problems of misalignment between the members arising from eccentricity of the relative axes of rotation and any angular displacement thereof. These problems are compounded further when variation in axial spacing is encountered between the rotatable members and through the coupling. With increasing use of removable modules for electronic gear the above outlined problems have, under some conditions, become accentuated. This is particularly the case when there is a requirement that coupling elements be permanently assembled to respective rotating members and still permit separation of the members in order that a module may be conveniently inserted and removed from electronic gear.

It is, therefore, a principal object of this invention to provide a flexible coupling for transmitting torque from one rotatably mounted member to another rotatably mounted member.

Another object is to provide a flexible coupling for transmitting torque from a setting device rotatably mounted in an electronic chassis to a position setting system in a module which may be readily removed and replaced in the chassis.

A further object is to provide flexible coupling means between two rotatably mounted members which permits separation of the members without any dismounting of coupling elements from respective rotatably mounted members.

Another object is to provide relatively high torque capabilities through coupling means readily adaptable to an extensive axial spacing variation range between two rotatably mounted members.

Features in the accomplishment of these objects are the provision of a sinuously formed band of resilient material having an arcuate center portion and having reverse turned or looped portions which terminate in mutually opposite inwardly extended ends, mounting means on a rotatable member for the band adapted for transmitting torque to the arcuate center portion of the band, and another rotatably mounted member having a slot adapted for receiving the center portion of the sinuously formed band. Such a flexible coupling may form part of a position setting drive system for a module. Features of such a drive system also include, a shaft having an end element with a projection adapted for extending into an opening through a module wall and for obtaining bearing support therein, a shoulder on the end element for bearing contact with the inner rim of the wall opening, and a spring for biasing the shoulder of the shaft end element into bearing contact with the rim of the module wall opening. In this arrangement the projection of the end element may be conveniently terminated in a plane flush with the outer surface of the module wall, and be provided with a slot adapted for receiving the center portion of a sinuously formed band of resilient material.

A specific embodiment representing what is presently regarded as the best mode of carrying out the invention is illustrated in the accompanying drawings.

Figure 2:
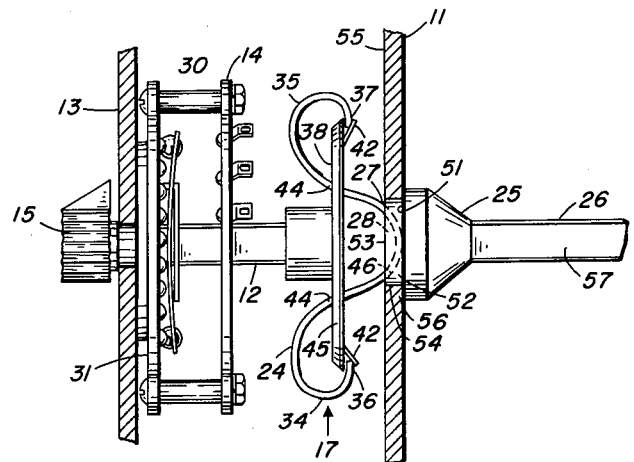

In the drawings:
FIG. 1 represents a perspective view of a position setting drive system for a removable module partially broken away and with the module partially removed from its position in a chassis;
FIG. 2, a fragmentary view showing coupling detail with a module in place; and
FIG. 3, a fragmentary view showing a drive shaft with its end element displaced from a wall opening to facilitate disassembly of the shaft from within the module.

Referring to the drawings:

Electronic gear chassis 10, which is conveniently adapted for receiving a module 11, as shown in FIGURE 1, is equipped with a drive member 12 rotatably mounted on chassis front panel 13. Drive member 12 may be equipped with a switching wafer 14 and has an indicator knob 15 for rotated settings as indicated by a position indicating dial 16 on the face of front panel 13. A flexible coupling structure 17 is mounted on the inner end of drive member 12 for providing a driving connection to the position setting drive system 18 of module 11 when the module is properly located in place on the bottom plate 19 of chassis 10 as determined by the action of locating pins 20 with respective module openings 21. When module 11 is in position, mating elements are connected such as, plug 22 in mating connection with socket 23, and spring 24 of flexible coupling structure 17 is in position for engagement with end element 25 of the rotatable shaft 26 of position setting drive system 18.

Coupling is complete when spring 24 and end element 25 are so aligned that the arcuate center portion 27 of the spring is received in slot 28 of end element 25. Slot 28 may be advantageously provided with an indexing notch 29 at one side for reference in rotational setting of slot 28 for proper coupling as module 11 is being inserted into position in chassis 10. Referring also to FIGURE 2, drive member 12 is shown to be equipped with a ball detent unit 30, part of which rotates with the shaft, and part of which is plate 31 which may be fixed to the back of chassis front panel 13. This provides means for holding the desired settings of knob 15 as indicated by dial 16 for the switching wafer 14, for the switching wafers 32 and 33 associated with position setting drive system 18, and any other devices that may be position set thereby within module 11.

The spring 24 of flexible coupling structure 17 may be a sinuously formed band of resilient material formed with an arcuate center portion 27 and with reverse turned or looped portions 34 and 35 which terminate in mutually opposite inwardly extended ends 36 and 37 respectively. Mounting means, non rotatably fixed on drive member 12, in the form of disk 38 is provided in flexible coupling structure 17 for mounting spring 24. The band of resilient material forming spring 24 is characterized in transverse section as being considerably wider than it is thick. This shaping of the band provides a great low rate flexing range in spring 24 which conveniently accommodates considerable variation in longitudinal spacing between drive member 12 and the end element 25 of position setting drive system 18. It also permits sufficient flexing of spring 24 for riding and sliding of the arcuate center portion 27 thereof over the front of module 11 as the module is being inserted into position or being removed from chassis 10. In addition, the considerably greater width as opposed to thickness of the band forming spring 24 is characterized by high torque transmitting capabilities through the coupling along with minimized torsional deflection of spring 24. These features of spring 24 are utilized to great advantage through the spring's mounting.

Spring 24 is mounted on a disk 38 which is non rotatably mounted on drive member 12 and axially fixed thereon, as by a set screw (not shown) and which, as best shown in FIGURE 1, is provided with channel means in the form of substantially aligned slots 39. These slots 39 are each formed with substantially parallel sides 40 and have mutually opposite outer ends 41. In addition, outwardly extended tabs 42 are advantageously formed at the outer end of each slot 39 from material stamped from respective slots 39. Spring 24 is mounted on disk 38 with arcuate center portion 27 extending forwardly therefrom in the direction of the end element 25 of shaft 26 and with the portions of the band forming spring 24 joining the arcuate portion 27 and the reverse turned portions 34 and 35 extending through respective slots 39. With this arrangement, the relatively narrow band edges 44 are engageable with respective slot edges 40 for the transmission of torque to arcuate center portion 27 and thereby to end element 25 of shaft 26. In addition, mutually opposite inwardly extended ends 36 and 37 extend inwardly over the forward side of the rim 45 of disk 38 and under respective tabs 42. Annular rim 45 which extends forwardly at an angle from the plane of disk 38 is so formed for increased rigidity and to strengthen the disk.

Flexing of the band forming spring 24 is confined substantially to the directions of low rate resilient flexing generally normal to the width of the band and extending throughout substantially the entire length of the spring. While, on the other hand, torque is transmitted through the relatively short portion of the band including the arcuate center portion 27 of the spring 24 and extending between the points of contact of band edges 44 with slot edges 40. Portions of the band edges 44 through the arcuate center portion 27 of spring 24 engage the sides of the slot 28 for transmitting torque to end element 25. Slot 28 is cut with an arcuate bottom surface or seat 46 to provide good seating for the similarly curved arcuate center portion 27 of spring 24. It should also be realized that space is provided for limited tilting of spring 24 about the lines of contact between band edges 44 with respective slot edges 40 to one side or the other. This tilting feature combined with a limited range for sliding of the spring center portion 27 along its seat 46 permits the coupling to automatically and easily adapt itself during rotation to minor axially misalignments as well as minor angular misalignments through the coupling elements.

Shaft 26 of position setting drive system 18 is rotatably mounted in module 11 by wafers 32 and 33. These wafers are, in turn, mounted by mounting structures 47 and 48 respectively on removable wall 49 to which the structures 47 and 48 are fastened as by screws 50. End element 25 which may be integral with shaft 26 or mounted on the end thereof is provided with a flange or shoulder 51. A cylindrical end projection 52 extends axially outwardly from said flange 51 and is terminated in an end face 53 through which the slot 28 is cut. Projection 52 is adapted to extend through the circular opening 54 of module wall 55 and may obtain additional bearing support therefrom for end element 25. Shoulder 51 is adapted for bearing contact and registry on the inner rim 56 of the module wall opening 54 when projection 52 is fully inserted in module wall opening 54. In addition, when end member 25 is so positioned end face 53 is shown to be flush with the outer face of module wall 55. Shaft 26 may be slidable through and keyed as by a longitudinally extended flat 57 to cooperating rotatable portions of switching wafers 32 and 33. An E shaped spring 58 is mounted at the top and bottom elements thereof by mounting pins 59 of mounting structure 48. The center portion 60 of E spring 58 exerts resilient force against end 61 of shaft 26 in order to urge shoulder 51 of end element 25 into bearing contact with the inner rim 56 of module wall 55. Obviously other biasing means could be utilized in place of E spring 58 for biasing shoulder 51 into bearing contact with the inner rim 56 of the opening 54. Any biasing arrangement, such as E spring 58 must exert greater resilient biasing force in seating shoulder 51 on inner rim 56 than the maximum force exerted by spring 24 on the seat 46 of end element 25.

Figure 3:
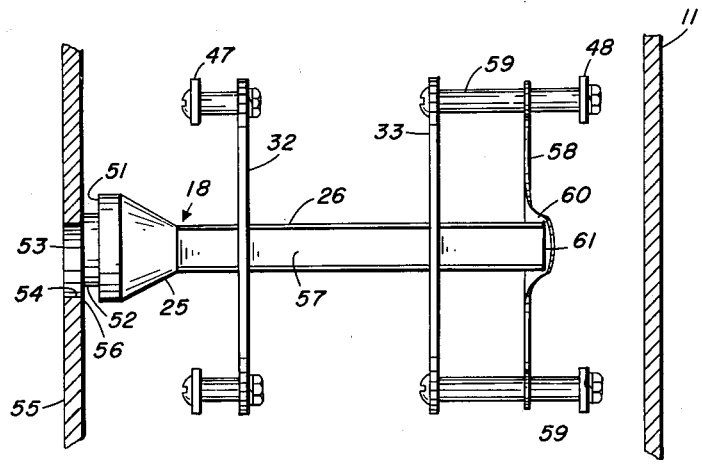

E spring 58, as indicated in FIGURE 3, is sufficiently flexible so that the center portion 60 may be deflected toward the rear when sufficient inward force is exerted on end face 53 to permit displacement of shaft 26 and end element 25 inwardly sufficiently for end face 53 to clear opening inner rim 56. This positions shaft 26 and end element 25 for removal of position setting drive system 18 along with wall 49 from module 11. Of course, conventional fastening means holding wall 49 to module 11 must have previously been loosened and plug 22 must be unfastened from module 11 or connecting wires, such as wires 62, must be of sufficient length as, for example, with service loops to permit such removal of the drive system 18 and wall 49 from the module 11.

Whereas this invention is here illustrated and described with respect to a specific embodiment thereof, it should be realized that various changes may be made without departing from the essential contributions to the art made by the teachings hereof.

I claim:

1. A flexible coupling for transmitting torque from a first rotatably mounted member to a second rotatably mounted member comprising a disk having slots and being mounted on said first member, a sinuous spring having a forwardly extending center portion, said spring being mounted on said disk and extending through said slots, said spring having end portions turned over the edge of said disk, and said second member being provided with a slot adapted for receiving the center portion of said spring.

2. In a flexible coupling for transmitting torque from a first rotatably mounted member to a second rotatably mounted member, a sinuously formed band of resilient material, said band being formed with an arcuate center portion and with reverse turned portions terminated in mutually opposite inwardly extended ends, mounting means for said band on said first rotatably mounted member, said mounting means being adapted for transmitting torque to the arcuate center portion of said band and said moutning means having portions extending into the reverse turned portions of said band, and said second rotatably mounted member being provided with a slot adapted for receiving the arcuate center portion of said band.

3. A flexible coupling for transmitting torque from a setting means to a rotatably mounted member comprising, a channel member formed with channel means having substantially parallel sides and mutually opposite outer ends, said channel member being mounted on said setting means, a sinuously formed band of resilient material, said band being formed with an arcuate center portion and with reverse turned portions, said reverse turned portions being terminated in mutually opposite inwardly extended band ends, said band being mounted on said channel member and extending through said channel means, said inwardly extended band ends extending over mutually opposite portions of said channel member, and said rotatably mounted member being provided with slot means adapted for receiving the arcuate center portion of said band.

4. The flexible coupling of claim 3 wherein, said channel member is provided with tabs at the mutually opposite outer ends of said channel means for overlying said inwardly extended band ends.

5. The flexible coupling of claim 3 wherein, said band of resilient material is substantially wider between its edges than it is thick throughout a substantial portion of its length, and said band being mounted for contact between the edges thereof and respective sides of said channel means.

6. In a position setting drive system for a module, a shaft rotatably mounted within said module, said shaft being provided with an end element having a projection adapted to extend into an opening of a module wall, said end element having a flange adapted for bearing contact with the inner rim of the module wall opening, spring means for resiliently biasing said shaft and the shoulder of said shaft element into bearing contact with the rim of the module opening, and a flexible coupling for transmitting torque from a rotatably mounted member to said shaft comprising, a sinuously formed band of resilient material, said band being formed with an arcuate center portion and with reverse turned portions terminated in mutually opposite inwardly extended ends, mounting means for mounting said band on said rotatably mounted member, said mounting means being adapted for transmitting torque to the arcuate center portion of said band, said mounting means having portions extending into the reverse turned portions of said band, and the end element of said shaft being provided with a slot adapted for receiving the arcuate center portion of said band.

7. The position setting drive system of claim 6 wherein, the arcuate center portion of said sinuously formed band exerts resilient force on the end element of said shaft when the rotatably mounted member and said module are positioned for transmission of torque through said coupling to said shaft, and said spring means being adapted for exerting greater resilient force on said shaft than the resilient force of said band and in opposition to the resilient force of said sinuously formed band.

8. The position setting drive system of claim 6 wherein, the projection of said end element is terminated in a plane in substantially flush relation with the outer surface of a module wall when the flange of said end element is in bearing contact with the inner rim of the module opening.

References Cited in the file of this patent

UNITED STATES PATENTS

| | | |
|---|---|---|
| 2,564,219 | Green | Aug. 14, 1951 |
| 2,700,283 | Schaaf | Jan. 25, 1955 |
| 2,724,251 | Weaver | Nov. 22, 1955 |
| 2,812,647 | Humphery | Nov. 12, 1957 |